March 11, 1969
K. BRAUN
3,432,186
ELECTRICALLY INSULATING COUPLING FOR PIPES AND THE LIKE
Filed May 13, 1968
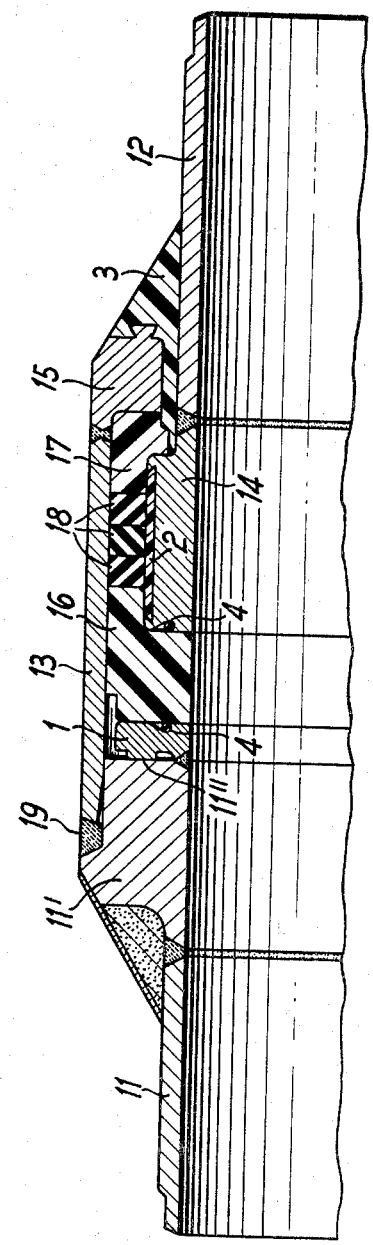
INVENTOR :
Karlheinz BRAUN
by Stephen K Frishauf
Atty United States Patent Office 3,432,186
Patented Mar. 11, 1969

3,432,186
ELECTRICALLY INSULATING COUPLING FOR PIPES AND THE LIKE
Karlheinz Braun, Kehl (Rhine), Germany, assignor to Eisenbau Albert Ziefle K.G., Kehl (Rhine), Germany, a firm of Germany
Filed May 13, 1968, Ser. No. 728,716
Claims priority, application Germany, June 15, 1967, E 34,195
U.S. Cl. 285—53
Int. Cl. F16l 13/02, 21/02, 59/16
5 Claims

ABSTRACT OF THE DISCLOSURE

To provide an electrically insulating coupling, which can be welded, without destruction to internal insulation material, a heat-blocking ring (1) is interposed between a metal, weldable collar and organic insulation material, the heat-blocking ring being formed with grooves and dimensioned to provide for air spaces within the coupling. Some of the grooves may be filled with a rubbery sealing mass.

---

The present invention relates to electrically insulating couplings for pipes, tubes and the like, and more particularly to such couplings in which insulating and packing rings are clamped between collars on the pipes, or parts thereof, which project in different dimensions, radially, the collars being surrounded by a sleeve and secured in position by welding.

When used in pipelines, gas mains, supplies for drinking water, pipes for storage tanks and the like, it is important that such couplings provide completely tight, as well as insulating connections, even under difficult operating conditions. The operating pressures to which such couplings may be subjected can go from 100 to 160 atmospheres. In the past, additional safety measures were often necessary in order to permit full utilization of couplings of a given size.

Couplings which are welded require care and skill in their installation, and particularly to prevent damage to the tube couplings due to the welding heat. Couplings having surface contacts of variously dimensioned sleeves, with interposed sealing rings, may be damaged by local overheating or even burning, adversely affecting the sealing and insulating properties of the coupling.

It is an object of the present invention to provide a coupling which ensures a high degree of safety while accomplishing the dual function of both sealing and electrical insulating.

*Subject matter of the present invention.*—Briefly, in accordance with the present invention, a heat-blocking ring is interposed between sealing or packing members and collars formed on the pipes, or pipe ends, respectively, to block direct transmission of welding heat from the weld point on the pipe collar to internal sealing rings. These sealing rings are dimensioned to provide an air space internally of the coupling and, in accordance with a feature of the invention, are formed with grooves which may be filled with a rubbery compound to effect additional sealing.

The improvement of the present invention provides for high electrical resistance to breakdown or flash over. This breakdown resistance can be further increased by placing a layer of an electrical insulating material of high dielectric and mechanical strength, such as an epoxy compound between the sealing rings and one of the metal coupling parts. A layer of epoxy of only 1–2 mm. thickness increases the breakdown potential which can be effectively isolated by the coupling in the order of 5–10 kv.

The sealing rings used in the coupling usually consist of fibrous material saturated or impregnated with plastics. Grooves, facing these plastic-impregnated rings and filled with a rubbery compound provide for even more effective sealing. A primary seal, and a secondary seal depending thereon, provide for effective safety in operation and pipe lines of high operating pressures, for example in the order of 100 atmospheres and more, can be safely constructed. This safety factor is particularly important when potable water sheds are being crossed by oil pipelines, or when the pipes are to carry fluids, such as raw oil, gasoline, or the like which contaminate water supply or land used for agricultural purpose.

The outer insulation of the coupling can be increased and improved, and assembly simplified by supplying a terminating ring of a setting adhesive compound, such as an epoxy resin in the form of a conical column, having a nonconcave outer surface merging smoothly with the weldable collar on the junction. Forming the terminal end in conical shape simplifies additional insulation by wrapping the usual insulation tape thereover, without leaving any possibilities of empty spaces. This further simplifies burial in trenches and has the advantage to supply a long creep distance, further improving insulation. This conical, non-concave termination is also important when the pipes are not buried. Peak potentials which may arise will not cause arcing over at the outside, and, if occurring at all, only interiorly of the coupling, thus permitting installation of the coupling in explosive atmospheres, for example in gas control stations.

The structure, organization, and operation of the invention will now be described more specifically with reference to the accompanying drawings, wherein the single figure is a longitudinal, cross-sectional view of half of the coupling.

The coupling of the present invention may be used with a diameter up to 1000 mm., and with a potential difference of at least 10,000 volts. It is particularly useful for ground installation and for direct burial without shaft lining or fireproof cover. There will be no flashover at the outer surfaces.

The two end portions of the pipes to be connected 11 and 12, are provided with collars 11′, 14, welded thereto as schematically indicated. The thickened, large collar 11′ will later be used for connection thereto of an outer sleeve 13, again by means of a weld 19. The outer sleeve 13 is pre-welded to an end ring 15 which has an end face formed with a projection for securing to pipe 12 by means of a terminal conical portion 3, consisting of epoxy resin or other similar material. End 15 projects internally and is separated from pipe end 12 by means of epoxy resin.

A collar 14, welded to pipe 12 as shown, extends radially outwardly but by a lesser distance than collar 11′, in order to leave a radial space between collar 14 and outer sleeve 13, to form a sealing space, in which sealing rings 18 are placed. Sealing rings 18 are held in position by spacer and insulating rings 16, 17, formed of plastic-impregnated fibers or fabric material. After insertion of the parts and assembly, and application of pressure of the parts towards each other to place the tubes into assembled relationship, and to press the packing and sealing rings 16, 17, 18 together, sleeve 13 is welded at 19 to collar 11′.

The welding heat, applied at the weld 19, might damage the various sealing and packing parts. In order to prevent such damage, a heat-blocking ring 1, for example of steel, is interposed between the inner shoulder 11″ of collar 11′ and packing or insulating ring 16. The heat-blocking ring 1 is so dimensioned that air gaps are formed between the sleeve and collar subject to the weld. It is in contact with the face 11″ of collar 11′ by means of ridges in order to further decrease the conduction of heat. The heat-insulating and blocking ring 1 may, prior to asembly, be secured to the collar 11″ by welding, as schematically shown in the drawing. The side remote from collar 11′ is formed with recesses or grooves, in which rubbery, elastic material such as O-rings 4 are inserted.

The electrical, as well as the mechanical sealing effectiveness of the coupling can be further improved by interposing a layer of a material having high electrical resistance, as well as mechanical strength between the sealing rings 18 and collar 14, as indicated by a layer of epoxy resin 2 in the figure. Epoxy layer 2 further improves the mechanical stability of the entire assembly, setting the various insulating and packing rings into one unitary hole.

The two ends of the coupling are provided with conically merging terminals, without concave surfaces, to provide for ease of wrapping of the pipe, and the coupling. The side close to the weld can be filled, after welding, with a conically tapering bituminous mass. The other side is provided with a cast epoxy ring 3, filling all cracks at the inside of the coupling and prividing, at the outside, a conical surface smoothly merging pipe 12 to the sleeve end piece 15 and sleeve 13, without leaving any gaps and providing for a long creep surface.

I claim:
1. Electrically insulating, sealing coupling for tube sections (11, 12) comprising
   a first collar (11′) extending from a first tube section (11);
   a second collar (14) extending from the second tube section (12) and of lesser diameter than said first collar;
   a sleeve (13) surrounding said collars and adapted to be welded (19) to said first collar, said sleeve being secured (15, 3) on said second tube section by an insulating adhesive (3);
   insulating sealing and spacer rings (16, 17, 18) sealing said second collar and said first collar and being pressed thereagainst when said coupler is assembled;
   and a heat blocking ring, interposed between said first collar and the next adjacent insulating and sealing ring (16), said heat blocking collar being dimensioned to leave an air space between said first collar, said sleeve, and said adjacent sealing ring (16).

2. Coupling according to claim 1 wherein said sealing rings (16, 17, 18) surround said second collar (14) and a layer (2) of high mechanical as well as electrical breakdown strength is interposed between said collar and said sealing rings.

3. Coupling according to claim 1 wherein said sleeve (13) is secured to said second tube (12) by a conical collar of epoxy forming a smoothly merging, non-concave surface (3) with the end (15) of said sleeve.

4. Coupling according to claim 1 wherein said heat blocking ring (1) is formed with grooves to provide additional air spaces, the projections between said grooves bearing against said first collar and providing a small-area contact therewith.

5. Coupling according to claim 1 wherein at least the sealing ring (16) facing said heat blocking ring (1) is formed of a plastic impregnating fibrous material, said heat blocking ring is formed with grooves facing said fibrous material ring (16) and elastic rubbery material inserts are located in at least some of said grooves.

References Cited

UNITED STATES PATENTS

| | | | |
|---|---|---|---|
| 1,231,202 | 6/1917 | Saylor | 285—53 |
| 3,325,191 | 6/1967 | Yates | 285—286 X |
| 3,353,563 | 11/1967 | Hutton | 285—54 X |

FOREIGN PATENTS 842,233  7/1960  Great Britain.

THOMAS F. CALLAGHAN, *Primary Examiner.*

U.S. Cl. X.R.

285—286; 29—157, 458